UNITED STATES PATENT OFFICE.

MAX LANDAU, OF BERLIN, GERMANY.

PROCESS OF PRESERVING WOOD.

1,274,171.  Specification of Letters Patent.  Patented July 30, 1918.

No Drawing.  Application filed January 25, 1916. Serial No. 74,074.

*To all whom it may concern:*

Be it known that I, MAX LANDAU, chemist, a subject of the King of Prussia and the German Emperor, residing at 29 Bayerischestreet, Berlin, Kingdom of Prussia, German Empire, have invented a new and useful Improvement in Processes of Preserving Wood; and I do hereby declare the following to be a full, clear, and exact description of the same.

My present invention refers to a new composition of matter and a new process for preserving wood.

My process consists in introducing an aqueous solution of trioxymethylene, also called commercially paraformaldehyde, into wood. Instead of the commercial trioxymethylene constituting a mixture of the various polymers of formaldehyde, one may also use the single polymers, alpha-, beta-, gama-trioxymethylene or artificial mixtures of the same. It has been known that the aqueous solution of formaldehyde, for instance the commercial solution of forty per cent., may prohibit the development of fungi and germs. The use of solutions of trioxymethylene, however, according to the present invention, has the advantage that the said solutions maintain for a long period their preserving properties, whereas solutions of formaldehyde lose their preserving power, especially in the impregnating process as necessary for preserving wood.

I may use a solution of trioxymethylene in hot water, for instance a solution of 0.15 per cent. trioxymethylene. I may however use also a solution of trioxymethylene of higher or lower percentage.

In certain cases for instance for preventing the formation of mold or for making wood fireproof it is suitable to introduce into the wood besides trioxymethylene certain water soluble salts of inorganic or organic acids. For preventing the formation of mold I may use alkalifluorids, as sodium fluorid or potassium silicofluorid or salts of the heavy metals as zincchlorid, copper sulfate, mercuric chlorid. I may also use salts of organic acids as, sodium or potassium phenolate or the heavy metal salts of phenol or naphthol. The salts of phenol sulfonic acid or naphthalene sulfonic acid are not recommendable.

For making wood fireproof I can use ammoniumsulfate, ammoniumphosphate, ammoniumborate, magnesiumsulfate together with the trioxymethylene.

I may use a solution of 1 part by weight of trioxymethylene and 6 parts by weight of sodium fluorid, 1000 parts by weight of water.

The composition of matter for preserving wood consists of trioxymethylene and salts suitable for preventing the formation of mold or for fireproofing wood. A suitable mixture consists of 1 part by weight of trioxymethylene and 6 parts by weight of sodium fluorid. The mixture may be compressed into the form of briquets or tablets of suitable size for instance so that one briquet or tablet is sufficient for 100 liters solution. For introducing the said solutions into wood I may immerse wood into the said solutions and allow it to lie a suitable period in the said solutions. Or I may bring the solutions on the surface of the wood. I may also subject the wood to a vacuum and introduce the solutions, preferably of 80–90 degrees centigrade under higher than atmospheric pressure into the wood.

In case that I use salts together with the trioxymethylene I may introduce the salts and the trioxymethylene separately. For instance I may introduce into the wood firstly a solution of trioxymethylene and then a solution of the salts or I may introduce firstly a solution of the salts and afterward a solution of the trioxymethylene.

The composition of matter herein described is made the subject of another application, Serial No. 167,564, filed May 9, 1917.

I claim:

1. The process for preserving wood which consists in introducing aqueous solutions of trioxymethylene and water soluble salts into the wood.

2. The process for preserving wood which consists in introducing aqueous solutions of trioxymethylene and water soluble salts of inorganic bases into the wood.

3. The process for preserving wood which consists in introducing aqueous solutions of trioxymethylene and water soluble salts of inorganic bases with inorganic acids into the wood.

4. The process for preserving wood which consists in introducing aqueous solutions of trioxymethylene and alkalifluorids into the wood.

In testimony whereof, I have signed my name to this specification in the presence of two subscribing witnesses.

MAX LANDAU.

Witnesses:
    HENRY HASPER,
    ARTHUR SCHROEDER.